(12) United States Patent  (10) Patent No.: US 8,730,606 B1
Tan et al.  (45) Date of Patent: May 20, 2014

(54) READ CHANNEL ERROR CORRECTION USING MULTIPLE CALIBRATORS

(71) Applicant: LSI Corporation, Milpitas, CA (US)

(72) Inventors: Weijun Tan, Longmont, CO (US); Shaohua Yang, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/681,917

(22) Filed: Nov. 20, 2012

(51) Int. Cl.
*G11B 5/09* (2006.01)

(52) U.S. Cl.
USPC .............................. 360/53; 360/46

(58) Field of Classification Search
None
See application file for complete search history.

(56) References Cited

U.S. PATENT DOCUMENTS

| 8,065,596 | B2 | 11/2011 | Gu |
| 2004/0032683 | A1 | 2/2004 | Ashley et al. |
| 2010/0073798 | A1* | 3/2010 | Cao .................................. 360/46 |
| 2011/0167227 | A1 | 7/2011 | Yang et al. |
| 2012/0124119 | A1 | 5/2012 | Yang |
| 2013/0201576 | A1* | 8/2013 | Grundvig ........................ 360/31 |
| 2013/0283107 | A1* | 10/2013 | Yang et al. ...................... 714/54 |

OTHER PUBLICATIONS

C. Douillard et al., "Iterative Correction of Intersymbol Interference: Turbo Equalization," European Transactions on Telecommunications, Sep.-Oct. 1995, pp. 507-511, vol. 6, No. 5.

* cited by examiner

*Primary Examiner* — Regina N Holder
(74) *Attorney, Agent, or Firm* — Ryan, Mason & Lewis, LLP

(57) ABSTRACT

Read channel circuitry comprises a decoder and error correction circuitry. The error correction circuitry is configured to calibrate a first set of filters using a read channel data signal, to determine first hard decision information regarding the read channel data signal using the calibrated first set of filters, to determine an error corrected read channel data signal using the first hard decision information, to calibrate a second set of filters using the error corrected read channel data signal, to determine second hard decision information regarding the error corrected read channel data signal using the calibrated second set of filters, and to decode the second hard decision information. The first set of filters and the second set of filters are calibrated in respective first and second calibrators.

20 Claims, 4 Drawing Sheets

READ CHANNEL ERROR CORRECTION USING MULTIPLE CALIBRATORS

BACKGROUND

Disk-based storage devices such as hard disk drives (HDDs) are used to provide non-volatile data storage in a wide variety of different types of data processing systems. A typical HDD comprises a spindle which holds one or more flat circular storage disks, also referred to as platters. Each storage disk comprises a substrate made from a non-magnetic material, such as aluminum or glass, which is coated with one or more thin layers of magnetic material. In operation, data is read from and written to tracks of the storage disk via a read/write head that is moved precisely across the disk surface by a positioning arm as the disk spins at high speed.

SUMMARY

In one embodiment, an apparatus comprises read channel circuitry comprising a decoder and error correction circuitry associated with the read channel circuitry. The error correction circuitry comprises: a first calibrator configured to calibrate a first set of filters using a read channel data signal; a first detector having an input coupled to the output of the first calibrator, the first detector being configured to determine first hard decision information regarding the read channel data signal using the first set of calibrated filters; an error compensation module having an input coupled to an output of the first detector, the error compensation module being configured to determine an error corrected read channel data signal using the hard decision information from the first detector; a second calibrator having an input coupled to an output of the error compensation module, the second calibrator being configured to calibrate a second set of filters using the error corrected read channel data signal; and a second detector having a first input coupled to an output of the error compensation module, a second input coupled to an output of the second calibrator, and an output coupled to an input of the decoder, the second detector being configured to determine second hard decision information regarding the error corrected read channel data signal using the second set of calibrated filters. The second hard decision information is decoded in the decoder.

Other embodiments of the invention include, by way of example and without limitation, methods and storage devices, virtual storage systems, integrated circuits and computer-readable storage media having computer program code embodied therein.

DETAILED DESCRIPTION

Embodiments of the invention will be illustrated herein in conjunction with exemplary disk-based storage devices, read channel circuitry and associated error correction circuitry for processing read channel data signals. For example, embodiments of the invention include HDDs or other types of storage devices that exhibit enhanced error compensation and decoding by implementing separate noise predictive filtering for read channel data signals and error corrected read channel data signals. It should be understood, however, that these and other embodiments of the invention are more generally applicable to any storage device in which improved error correction is desired. Additional embodiments may be implemented using components other than those specifically shown and described in conjunction with the illustrative embodiments.

Figure 1:
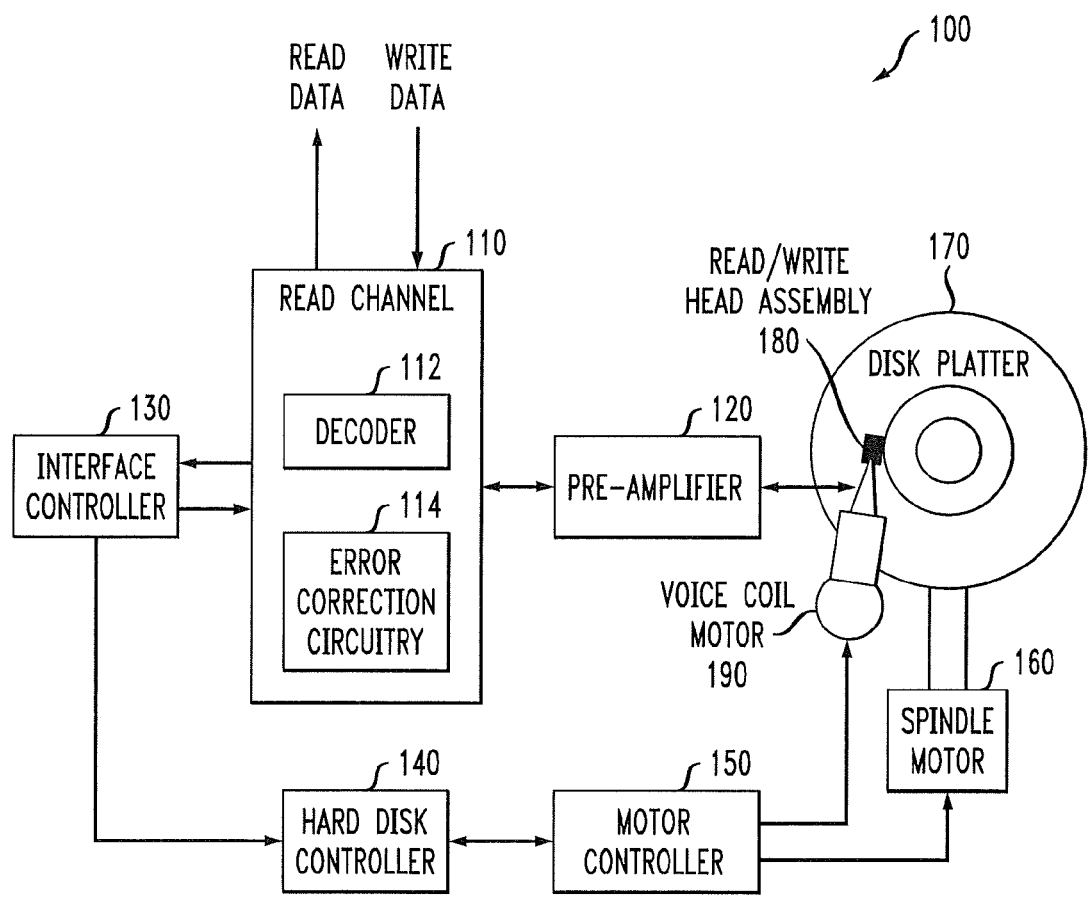
FIG. 1 shows a disk-based storage device, according to an embodiment of the invention.

The following acronyms are utilized in this description:
DFIR Digital Finite Impulse Response
EC Error Correction
HDD Hard Disk Drive
LDPC Low-Density Parity Check
LLR Log Likelihood Reliability
MAP Maximum a Posteriori Probability
NPFIR Noise Predictive Finite Impulse Response
NRZ Non Return to Zero
RAID Redundant Array of Independent Storage Devices
RPM Revolutions Per Minute
RS Reed Solomon
SOVA Soft-output Viterbi Algorithm FIG. 1 shows a disk-based storage device 100 including read channel circuitry 110 having a decoder 112 and error correction circuitry 114 in accordance with various embodiments of the invention. Although shown in FIG. 1 as being incorporated within read channel circuitry 110, the error correction circuitry 114 may also be implemented at least in part externally to the read channel circuitry 110. Storage device 100 may be, for example, a hard disk drive. Storage device 100 also includes a preamplifier 120, an interface controller 130, a hard disk controller 140, a motor controller 150, a spindle motor 160, a disk platter 170, read/write head assembly 180, and voice coil motor 190. Interface controller 130 controls addressing and time of data to and from disk platter 170. In some embodiments, disk platter 170 includes magnetic signals recorded in accordance with either a longitudinal or a perpendicular recording scheme.

Read/write head assembly 180 is positioned by voice coil motor 190 over a desired data track on disk platter 170. Motor controller 150 controls the voice coil motor 190. Motor controller 150 controls the voice coil motor 190 to position read/write head assembly 180 in relation to disk platter 170 and drives spindle motor 160 by moving read/write head assembly 180 to the proper data track on disk platter 170 under direction of hard disk controller 140. Spindle motor 160 spins disk platter 170 at a determined spin rate (RPMs).

Once read/write head assembly 180 is positioned adjacent the proper data track, magnetic signals representing data on disk platter 170 are sensed by read/write head assembly 180 as disk platter 170 is rotated by spindle motor 160. The sensed magnetic signals are provided as an analog signal representative of the magnetic data on disk platter 170. This analog signal is transferred from read/write head assembly 180 to read channel circuitry 110 via preamplifier 120. Preamplifier 120 is operable to amplify the analog signals accessed from disk platter 170. In turn, read channel circuitry 110 decodes and digitizes the received analog signal to recreate the information originally written to disk platter 170. This data is provided as read data.

Various elements of the storage device 100 may be implemented at least in part within a processing device. A processing device includes a processor and a memory, and may be implemented at least in part within an associated host computer or server in which the storage device 100 is installed. Portions of the processing device may be viewed as comprising "control circuitry" as that term is broadly defined herein.

It is important to note that storage device 100 may include other elements in addition to or in place of those specifically shown, including one or more elements of a type commonly found in a conventional implementation of such a storage device. These and other conventional elements, being well understood by those skilled in the art, are not described in detail herein. It should also be understood that the particular arrangement of elements shown in FIG. 1 is presented by way of illustrative example only. Those skilled in the art will recognize that a wide variety of other storage device configurations may be used in implementing embodiments of the invention.

In order to improve the data readout performance of storage device 100, the read channel circuitry 110 incorporates error compensation and correction coding functionality through error correction circuitry 114. One source of potential errors is noise. There are several types of noise, including electronic noise in a signal from the read head, and data-dependent noise. Data-dependent noise can be caused by a variety of factors, including physical imperfections of the HDD storage disks and magnetic transition jitter in the HDD storage disks.

Figure 2:
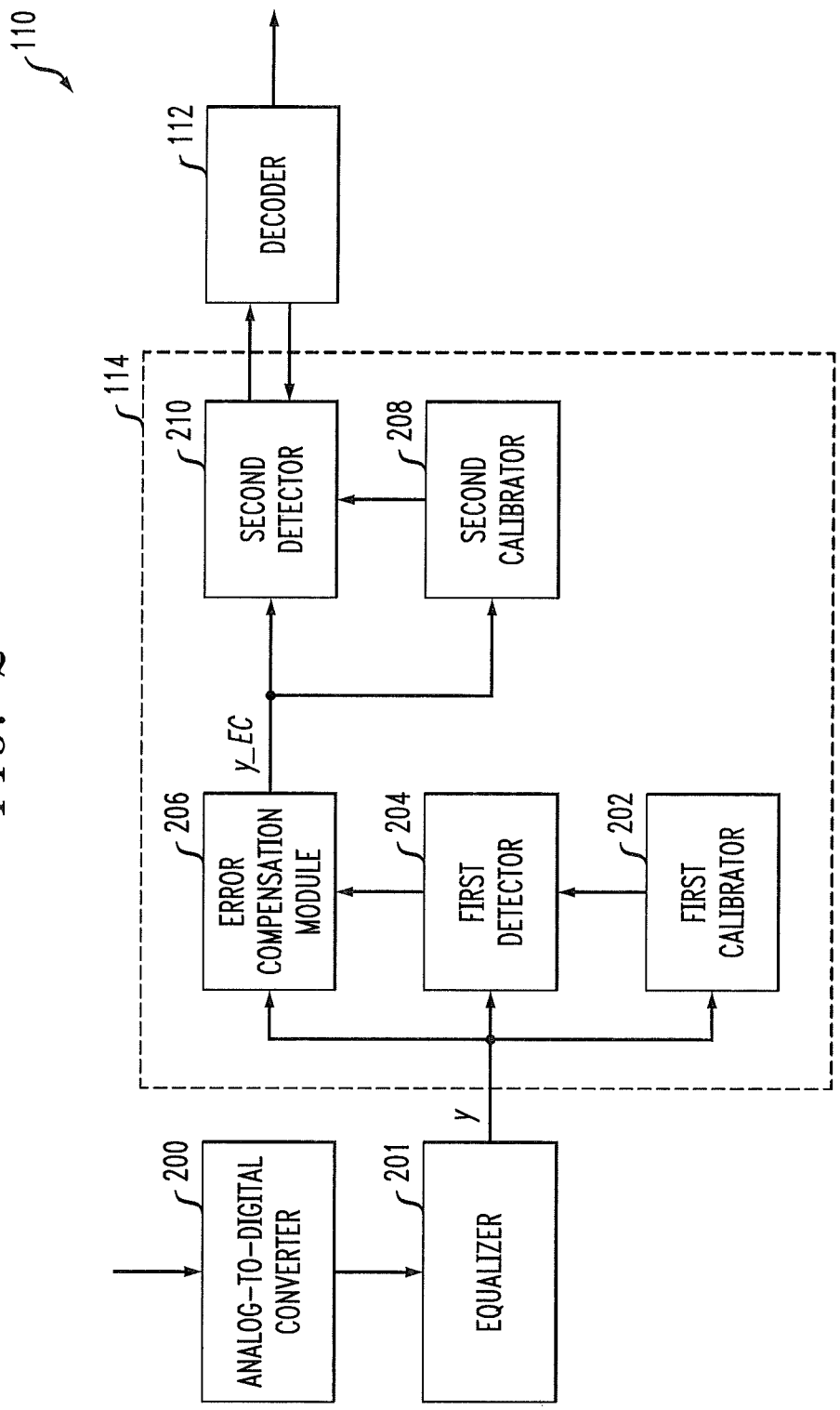
FIG. 2 is a detailed view of portions of the read channel circuitry of FIG. 1, according to an embodiment of the invention.

Referring now to FIG. 2, an example of read channel circuitry 110 is shown, with analog-to-digital converter 200, equalizer 201, error correction circuitry 114 and decoder 112. Analog-to-digital converter 200 receives an analog signal and converts the analog signal to a digital data signal. The analog signal represents information received from the read/write head assembly 180 and preamplifier 120. An output of the analog-to-digital converter is coupled to an input of equalizer 201. The equalizer 201 equalizes the digital signal to determine a read channel data signal. In some embodiments, the equalizer 201 comprises one or more digital finite impulse response (DFIR) filters and other circuitry used to equalize a digital signal comprising a number of samples received from the analog-to-digital converter 200. The equalizer calculates a number of equalized samples y according to the equation $$y(k) = \sum_{i=-j_1}^{j_2} a_i x(k-i) + n(k) \quad (1)$$

where $a_i$ correspond to equalizer coefficients, x represents non return to zero (NRZ) data, k is media data, and n is a noise term. The number of coefficients $a_i$ is determined by the DFIR filter used in the equalizer 201. For example, a 16-tap DFIR filter may use $j_1=6$ and $j_2=9$. Other 16-tap filters may use different values for $j_1$ and $j_2$. The y-samples output from the equalizer are an example of what is more generally referred to herein as a read channel data signal.

The y-samples are received at respective inputs of a first calibrator 202, a first detector 204, and an error compensation module 206 as shown in FIG. 2. The first calibrator 202 performs calibration of a first set of filters using the y-samples. Thus, the first calibrator 202 performs calibration on the read channel data signal. The first set of filters may be noise predictive finite impulse response (NPFIR) filters. This calibration is a noise-predictive calibration. The first calibrator 202 has an output coupled to an input of the first detector 204. The first calibrator 202 transfers information to the first detector 204. This information is used to train the first detector 204.

The first detector 204 comprises at least one set of NPFIR filters. The information transferred from the first calibrator 202 includes, for example, sets of NPFIR filter tap coefficients, edge ideals and edge biases. As will be appreciated by one skilled in the art, various types of filters may be used. For example, the first detector 204 may include any number of NPFIR filters as desired. Similarly, the order of the NPFIR filters can vary as desired for a particular arrangement.

In some embodiments, the first detector 204 comprises a soft-output Viterbi algorithm (SOVA) detector which includes a number of NPFIR filters. In other embodiments, the first detector 204 comprises a maximum a posteriori probability (MAP) detector or a combination of SOVA and MAP detectors. The first detector 204 receives the y-samples, along with calibration information from the first calibrator 202. The first detector 204 is configured to determine both a hard decision and a soft decision for each of the samples. The soft decision is in indication of the reliability of the hard decision. The first detector 204 may alternately be referred to as a loop detector. The loop detector provides hard decision and/or log likelihood reliability (LLR) information to the analog front end loop of the read channel circuitry 110, the first calibrator 202, and various other components. For example the hard decision and/or LLR information may be provided to a media defect detector, which will be described in further detail below.

Error compensation module 206 receives the y-samples. Error compensation module 206 also receives the hard decisions from the first detector 204. The error compensation module 206 may also be referred to as an error correction window. The error compensation module 206 determines an error correction term EC from the information received from the first detector 204.

In some embodiments, the error compensation module 206 comprises a low pass filter. The low pass filter determines a set of ideal y-samples $y_{ideal}$ according to the following equation $$y_{ideal}(k) = \hat{x}_k g_0 + \hat{x}_{k-1} g_1 + \hat{x}_{k-2} g_2 \quad (2)$$

where $\hat{x}$ is the hard decision and g is a set predetermined channel targets. The hard decision $\hat{x}$ is either 0/1 or ±1. The error corrected y-samples, or y_EC is determined according to the following equation $$y\_EC = y - lpf(y - y_{ideal}) \quad (3)$$

where lpf is the low pass filter function. The error compensation module 206 is configured to send y_EC to the second calibrator 208 and the second detector 210. y_EC is an example of what is more generally referred to herein as an error corrected read channel data signal.

The second calibrator 208 calibrates a second set of filters using y_EC. Thus, the second calibrator 208 performs calibration on the error corrected read channel data signal. The second set of filters may be a set of NPFIR filters. The second calibrator 208 may perform noise predictive calibration similar to that described above with respect to the first calibrator 202. The second detector 210 receives calibration information from the second calibrator 208. As such, the second detector 210 is trained using the calibration information from the second calibrator 208. Both the second calibrator 208 and second detector 210 include one or more NPFIR filters, and as such the information comprises sets of NPFIR filter tap coefficients, edge ideals and edge biases.

The second detector 210 may comprise a SOVA or MAP detector as described above. The second detector 210 is configured to determine a hard decision and a soft decision, the soft decision indicating a reliability of the hard decision. The second detector 210 is configured to send the hard decision and soft decision, or some information derived from either or both of the hard decision and the soft decision, to the decoder 114. The decoder 114 is configured to decode and reconstruct the data. The decoder 114 may be a low-density parity check (LDPC) decoder, Reed Solomon (RS) decoder, or any other type of decoder. The decoder 114 performs an iterative decoding process by exchanging information with the second detector 210 as will be appreciated by one skilled in the art. For example, if the decoder 114 is an LDPC decoder, the iterative decoding is based at least in part on soft decisions exchanged between the second detector 210 and decoder 114. If the decoder 114 is an RS decoder, decoding is based at least part on the hard decision and soft decision from the second detector 210.

The error correction circuitry 114 shown in FIG. 2 provides various benefits compared to conventional approaches. For example, the independent calibration of the first detector 204 and the second detector 210 can increase the error correction performance of the error correction circuitry 114. In conventional arrangements, a single calibrator is used to train NPFIR filters for multiple detectors. A single calibrator is unable to calibrate NPFIR filters on more than one different detector input simultaneously. As such, calibration is not performed optimally for each detector, thus leading to poorer error correction performance and accuracy. Embodiments of the invention, however, use separate calibrators 202 and 208 to train NPFIR filters for first detector 204 and second detector 210, respectively. Thus, the NPFIR filters of each of the first detector 204 and the second detector 210 are continuously calibrated, leading to improved error correction accuracy and performance. It is important to note that while not explicitly shown in FIG. 2, each of the first calibrator 202 and the second calibrator 208 may receive feedback from decoder 114 or another source to improve calibration performance.

In some embodiments, the read channel circuitry 110 further comprises a media defect detector. The media defect detector is configured to determine if the analog signal from the read/write head assembly 180 and preamplifier 120 has experienced an error such as a media defect in the storage disk, a thermal asperity condition, or a false sync/miss detection. Upon determining that such a condition exists, the media defect detector is configured to send a media defect flag signal to the second detector 204, the first calibrator 202 and the second calibrator 208. The first calibrator 202 and the second calibrator 208 do not perform calibration on the read channel data signal when a media defect flag signal is received, as calibration and/or training data based on a defective signal harms error correction and compensation.

In some embodiments, the error correction circuitry 114 further includes a multiplexer. The multiplexer is configured to receive a known data signal and output the known data signal to the first calibrator 202 and the second calibrator 208. The known data signal may the NRZ data x(k) as described above. In the known data mode, the first calibrator 202 and the second calibrator 208 uses the known data signal to perform initial set-up for the various NPFIR filters and other circuitry included in the first calibrator 202 and the second calibrator 208.

The first detector 204 and the second detector 208 are configured with respective sets of filters, such as respective sets of NPFIRs. The order of NPFIRs of the first detector 204 may be lower than that of an order of the NPFIRs of the second detector 208, or vice versa. For example, in some embodiments, the NPFIRs of the first detector 204 have a relatively low order and thus a lower computation cost, while NPFIRs of the second detector 208 have a relatively higher order because the NPFIRs of the second detector 208 determine reliability of an error corrected input y_EC.

Figure 3:
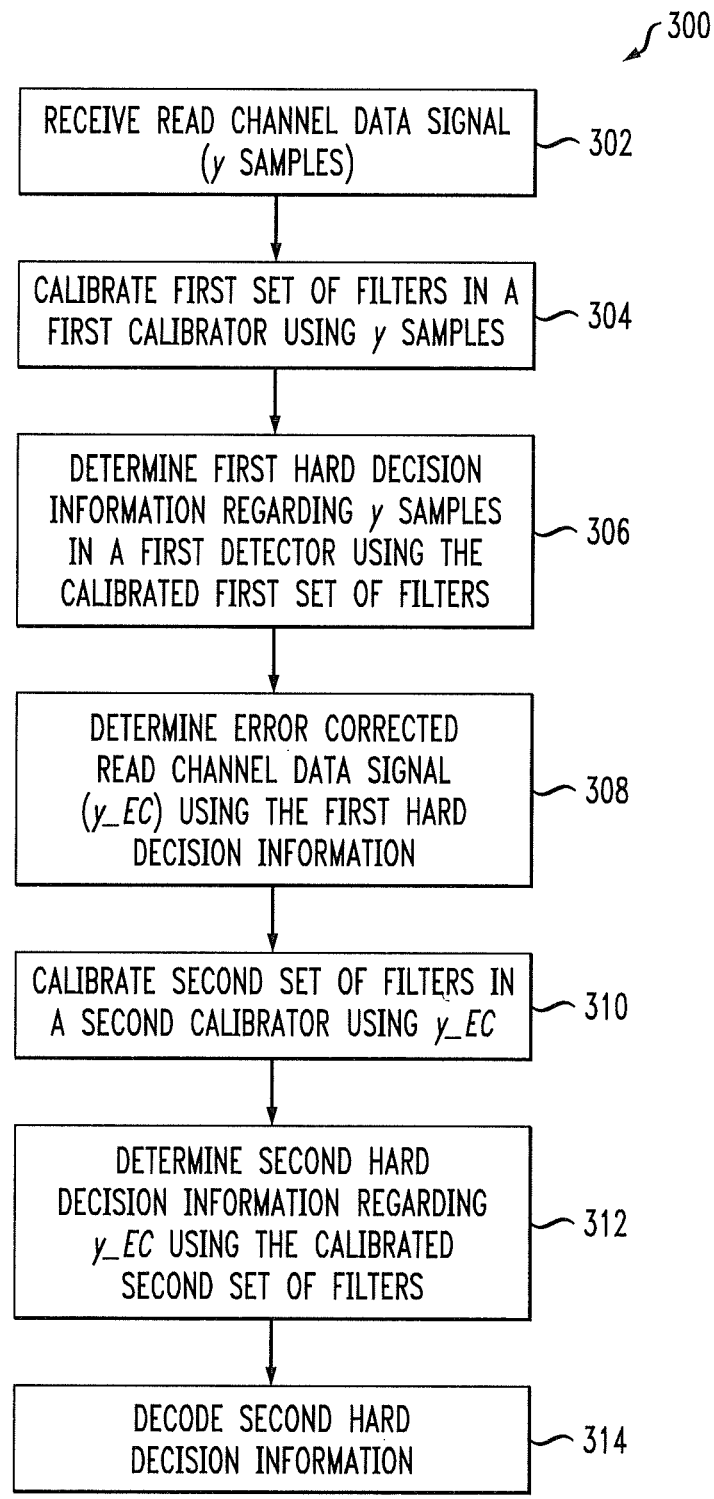
FIG. 3 illustrates a method of processing read channel data signals, according to an embodiment of the invention.

FIG. 3 illustrates a methodology 300 performed in the error correction circuitry 114 shown in FIG. 2. In step 302, a read channel data signal, of which y-samples is one example, is received. Next, a first set of filters are calibrated 304 in a first calibrator using the y-samples. As discussed above, the first set of filters may be a set of NPFIRs. In step 306, first hard decision information is determined using the calibrated first set of filters. The first hard decision information may be determined in a first detector. As discussed above, in some embodiments the first detector is a SOVA or MAP detector. The first hard decision information comprises a hard decision for each of the y-samples. The first detector, as discussed above, may also determine a soft decision for each of the hard decisions, where the soft decisions indicate reliability of the hard decisions.

An error corrected read channel data signal, an example of which is y_EC, is determined in step 308. y_EC is determined using the first hard decision information from step 306. A second set of filters is then calibrated 310 in a second calibrator using y_EC. Again, as discussed above the second set of filters may be a set of NPFIRs. In step 312, second hard decision information is determined using the calibrated second set of filters. The second hard decision information may be determined in a second detector. As discussed above, in some embodiments the second detector is a SOVA or MAP detector. The second hard decision information comprises a hard decision for each of the error corrected y-samples in y_EC. The second detector, as discussed above, may also determine a soft decision for each of the hard decisions, where the soft decisions indicate reliability of the hard decisions. Finally, the second hard decision information is decoded 314.

It is to be appreciated that the particular circuitry arrangements shown in FIGS. 1 and 2 are presented by way of example only, and other embodiments of the invention may utilize other types and arrangements of elements for implementing error correction functionality for a read channel decoder as disclosed herein. For example, while embodiments have been described above wherein there are two separate calibrators and two separate detectors, in other arrangements more calibrators and/or detectors may be used. For example, in some embodiments a second error compensation module may have an input coupled to the output of the second detector. The second error compensation module may have an output coupled to a third calibrator and a third detector. In some arrangements, the second calibrator may be used to train more than one detector. For example, the second calibrator can train the second detector and a third detector.

As mentioned previously, the storage device configuration can be varied in other embodiments of the invention. For example, the storage device may comprise a hybrid HDD which includes a flash memory in addition to one or more storage disks.

In addition, storage device 100 may be coupled to or incorporated within a host processing device, which may be a computer, server, communication device, etc.

Figure 4:
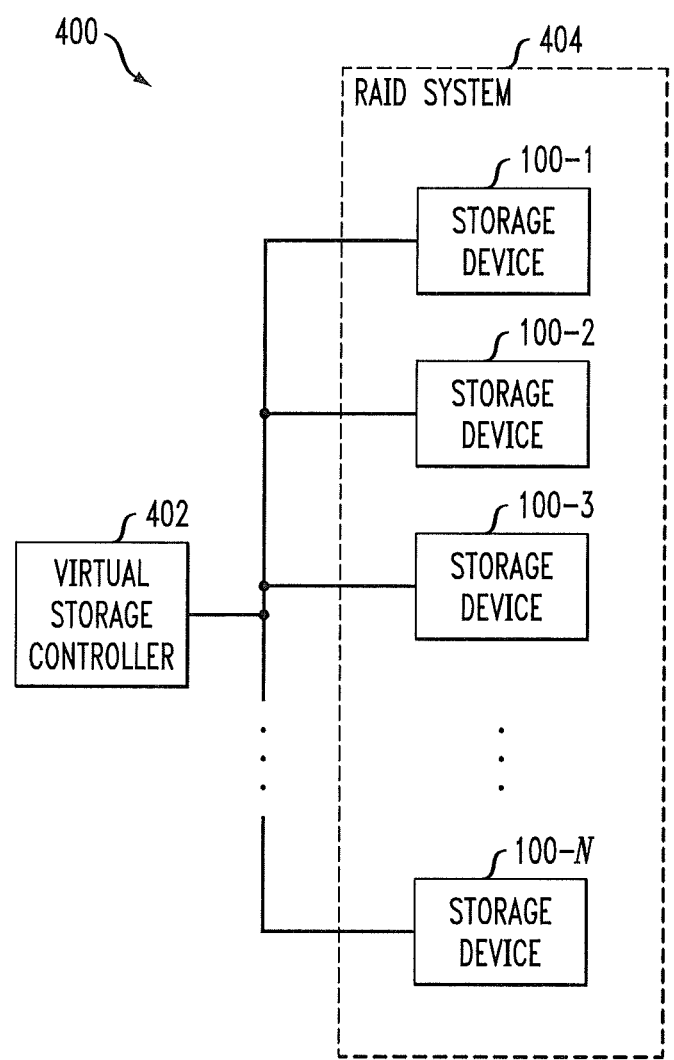
FIG. 4 shows a virtual storage system incorporating a plurality of disk-based storage devices of the type shown in FIG. 1, according to an embodiment of the invention.

Multiple storage devices 100-1 through 100-N possibly of various different types may be incorporated into a virtual storage system 400 as illustrated in FIG. 4. The virtual storage system 400, also referred to as a storage virtualization system, illustratively comprises a virtual storage controller 402 coupled to a RAID system 404, where RAID denotes Redundant Array of Independent storage Devices. The RAID system more specifically comprises N distinct storage devices denoted 100-1, 100-2, . . . 100-N, one or more of which may be HDDs and one or more of which may be solid state drives. Furthermore, one or more of the HDDs of the RAID system are assumed to be configured to include read channel circuitry and associated error correction circuitry as disclosed herein. These and other virtual storage systems comprising HDDs or other storage devices are considered embodiments of the invention.

It should again be emphasized that the above-described embodiments of the invention are intended to be illustrative only. For example, other embodiments can use different types and arrangements of storage disks, read/write heads, read channel circuitry, error correction circuitry, decoders, filters, calibrators, detectors, and other storage device elements for implementing the described error correction functionality. Also, the particular manner in which certain steps are performed in the error correction process may vary. These and numerous other alternative embodiments within the scope of the following claims will be apparent to those skilled in the art.

What is claimed is:

1. An apparatus comprising:
   read channel circuitry comprising a decoder; and
   error correction circuitry associated with the read channel circuitry, the error correction circuitry comprising:
   a first calibrator configured to calibrate a first set of filters using a read channel data signal;
   a first detector having an input coupled to the output of the first calibrator, the first detector being configured to determine first hard decision information regarding the read channel data signal using the first set of calibrated filters;
   an error compensation module having an input coupled to an output of the first detector, the error compensation module being configured to determine an error corrected read channel data signal using the hard decision information from the first detector;
   a second calibrator having an input coupled to an output of the error compensation module, the second calibrator being configured to calibrate a second set of filters using the error corrected read channel data signal; and
   a second detector having a first input coupled to an output of the error compensation module, a second input coupled to an output of the second calibrator, and an output coupled to an input of the decoder, the second detector being configured to determine second hard decision information regarding the error corrected read channel data signal using the second set of calibrated filters;
   wherein the second hard decision information is decoded in the decoder.

2. The apparatus of claim 1, wherein the decoder comprises a low-density parity check decoder.

3. The apparatus of claim 1, wherein at least one of the first detector and the second detector comprises at least one of: a soft output Viterbi algorithm detector and a maximum a posteriori probability detector.

4. The apparatus of claim 1, wherein at least one of the first calibrator and the second calibrator is configured to perform noise predictive calibration of the read channel data signal.

5. The apparatus of claim 1, wherein the first calibrator is configured to transfer filter information to the first detector.

6. The apparatus of claim 5, wherein the first set of filters comprises a set of noise predictive finite impulse response filters and wherein the filter information comprises a set of noise predictive finite impulse response filter tap coefficients, edge ideals and edge biases.

7. The apparatus of claim 1, wherein the read channel circuitry further comprises a media defect detector, the media defect detector being configured to send a media defect flag signal to the second detector, the first calibrator and the second calibrator, the media defect flag signal indicating at least one of: a media defect, a thermal asperity condition and a false sync or miss detection.

8. The apparatus of claim 7, wherein the first calibrator and the second calibrator are configured to skip calibration of the first set of filters and the second set of filters, respectively, when the media defect flag signal is received.

9. The apparatus of claim 1, wherein the error compensation module is configured to calculate an error correction term based at least in part on the first hard decision information, the error corrected read channel data signal being a function of the read channel data signal and the error correction term.

10. The apparatus of claim 1, wherein the first calibrator, the first detector and the error compensation module are configured to receive the read channel data signal from a digital finite impulse response filter.

11. The apparatus of claim 1, wherein the error correction circuitry further comprises a multiplexer, the multiplexer being configured to receive a known data signal, the multiplexer being configured to send the known data signal to the first calibrator and the second calibrator.

12. The apparatus of claim 1, wherein the first hard decision information comprises a set of hard decisions and reliability indicators associated with the hard decisions.

13. The apparatus of claim 1, further comprising a disk controller coupled to the read channel circuitry.

14. The apparatus of claim 1 wherein the read channel circuitry and associated error correction circuitry are fabricated in at least one integrated circuit.

15. A storage device comprising the apparatus of claim 1.

16. A virtual storage system comprising the storage device of claim 15.

17. A method comprising the steps of:
   calibrating a first set of filters using a read channel data signal;
   determining first hard decision information regarding the read channel data signal using the calibrated first set of filters;
   determining an error corrected read channel data signal using the first hard decision information;
   calibrating a second set of filters using the error corrected read channel data signal;
   determining second hard decision information regarding the error corrected read channel data signal using the calibrated second set of filters; and
   decoding the second hard decision information;
   wherein the first set of filters and the second set of filters are calibrated in respective first and second calibrators.

18. The method of claim 17, wherein the first set of filters comprises a set of noise predictive finite impulse response filters and wherein the step of determining the first hard decision information comprises receiving a set of noise predictive finite impulse response filter tap coefficients, edge ideals and edge biases from the first calibrator.

19. A non-transitory computer-readable storage medium having embodied therein executable code for performing the steps of the method of claim 17.

20. A storage device comprising:
   at least one storage medium;
   a read head configured to read data from the storage medium; and
   control circuitry coupled to the read head and configured to process data received from the read head;

the control circuitry comprising:
read channel circuitry comprising a decoder; and
error correction circuitry associated with the read channel circuitry, the error correction circuitry comprising:
- a first calibrator configured to calibrate a first set of filters using a read channel data signal;
- a first detector having an input coupled to the output of the first calibrator, the first detector being configured to determine first hard decision information regarding the read channel data signal using the first set of calibrated filters;
- an error compensation module having an input coupled to an output of the first detector, the error compensation module being configured to determine an error corrected read channel data signal using the hard decision information from the first detector;
- a second calibrator having an input coupled to an output of the error compensation module, the second calibrator being configured to calibrate a second set of filters using the error corrected read channel data signal; and
- a second detector having a first input coupled to an output of the error compensation module, a second input coupled to an output of the second calibrator, and an output coupled to an input of the decoder, the second detector being configured to determine second hard decision information regarding the error corrected read channel data signal using the second set of calibrated filters;

wherein the second hard decision information is decoded in the decoder.

* * * * *

UNITED STATES PATENT AND TRADEMARK OFFICE
CERTIFICATE OF CORRECTION

PATENT NO. : 8,730,606 B1
APPLICATION NO. : 13/681917
DATED : May 20, 2014
INVENTOR(S) : Weijun Tan et al.

Page 1 of 1

It is certified that error appears in the above-identified patent and that said Letters Patent is hereby corrected as shown below:

In the Specification

Col. 5, line 3, please change "114" to --112-- in both places

Col. 5, line 4, please change "114" to --112--

Col. 5, line 6, please change "114" to --112--

Col. 5, line 9, please change "114" to --112--

Col. 5, line 11, please change "114" to --112--

Col. 5, line 12, please change "114" to --112--

Col. 5, line 34, please change "114" to --112--

Col. 5, line 54, after "may" please insert --be--

Signed and Sealed this
Twelfth Day of August, 2014

Michelle K. Lee
*Deputy Director of the United States Patent and Trademark Office*